United States Patent

Bordignon et al.

[11] Patent Number: 5,956,928
[45] Date of Patent: Sep. 28, 1999

[54] METHOD TO FORM BUNDLES OF ROLLED SECTIONS AND RELATIVE DEVICE

[75] Inventors: Giuseppe Bordignon, Bicinicco; Andrea De Luca, Remanzacco, both of Italy

[73] Assignee: Danieli & C. Officine Mecchaniche SpA, Buttrio, Italy

[21] Appl. No.: 08/991,651

[22] Filed: Dec. 16, 1997

[30] Foreign Application Priority Data

Dec. 31, 1996 [IT] Italy ................. UD96A0251

[51] Int. Cl.⁶ ............. B65B 19/34; B65B 35/50
[52] U.S. Cl. ............. 53/444; 53/447; 53/150; 53/540; 414/792.8; 414/745.9; 414/746.7; 414/746.8
[58] Field of Search ............. 53/444, 447, 148, 53/149, 150, 540; 414/745.7, 745.9, 746.7, 746.8, 792.8, 793.6

[56] References Cited

U.S. PATENT DOCUMENTS

| | | | |
|---|---|---|---|
| 2,592,642 | 4/1952 | Bardet | 53/150 |
| 4,389,148 | 6/1983 | Lorenz | 414/745.9 |
| 4,579,498 | 4/1986 | Lukkari et al. | 414/746.7 |
| 5,632,594 | 5/1997 | Missing | 414/746.7 |

FOREIGN PATENT DOCUMENTS

| | | |
|---|---|---|
| 0282800 | 9/1988 | European Pat. Off. |
| 2401174 | 7/1975 | Germany . |
| 2445470 | 4/1976 | Germany . |
| 9614247 | 5/1996 | WIPO . |

*Primary Examiner*—Linda Johnson
*Attorney, Agent, or Firm*—Stevens, Davis, Miller, & Mosher, L.L.P.

[57] ABSTRACT

A method to form bundles (11) of one or more layers (20) of adjacent rolled sections (12). The method comprises discharging the rolled sections (12) from a terminal end (13a) of a transporter to cause the rolled sections (12) to fall from the terminal end (13a) onto discharge rods (14); forming at least one layer (20) of the rolled sections (12), which fall from the terminal end (13a) of the transporter (13) onto the discharge rods (14), the discharge rods (14) being arranged parallel to the transporter (13) and underneath the upper plane where the sections (12) are transported on the transporter (13). The discharge rods (14) are axially displaced with respect to the transporter (13) to define from time to time a lateral discharge space ("s") adjacent the terminal end (13a), for placing the sections (12) on the rods (14), wherein the lateral discharge space ("s") equals a transverse dimension of each rolled section (12). The axial displacements ("s") of the rods (14) with respect to the transporter (13) are correlated with the discharge of the sections (12) from the transporter (13). The discharge rods (14) progressively retract to transfer the layer (20) of the discharge rods (14) to a storage and unloading assembly (17) which has a least one transfer element (21) located on a plane below the discharge rods and lowering from time to time the transfer element (21) to discharge the rolled sections. Repeating these steps progressively forms a bundle (11) with a desired number of layers (20). A device for performing this process is also provided.

20 Claims, 3 Drawing Sheets

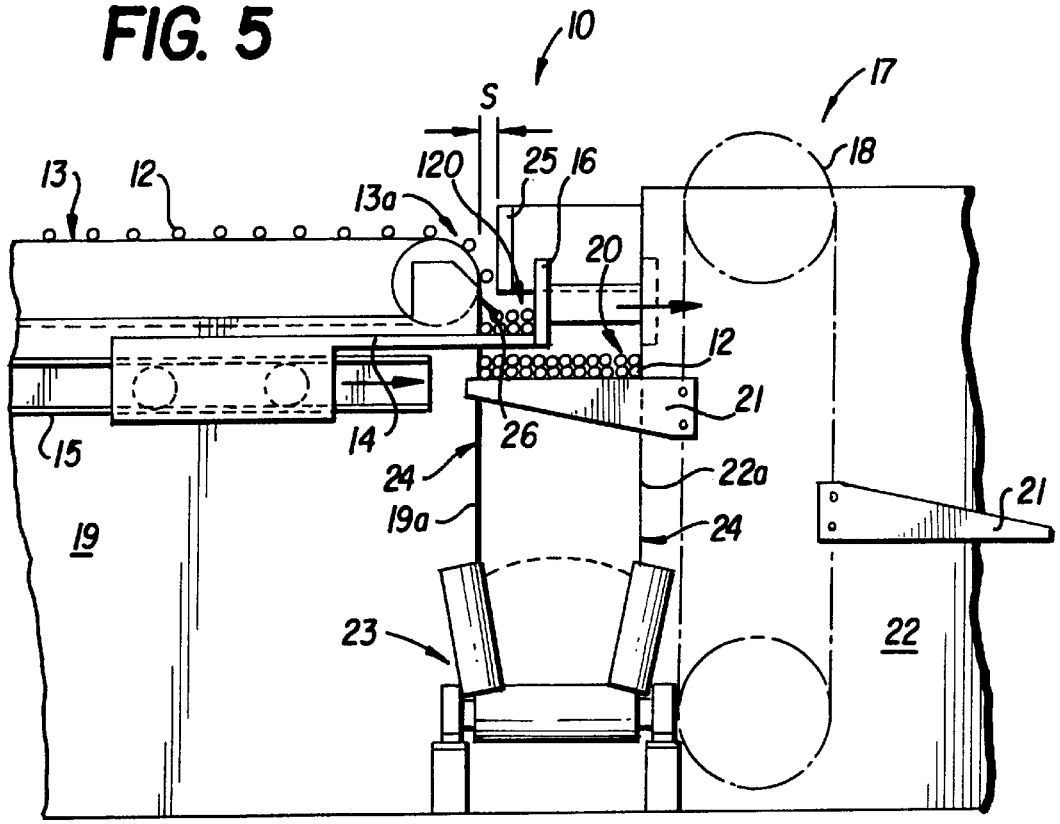
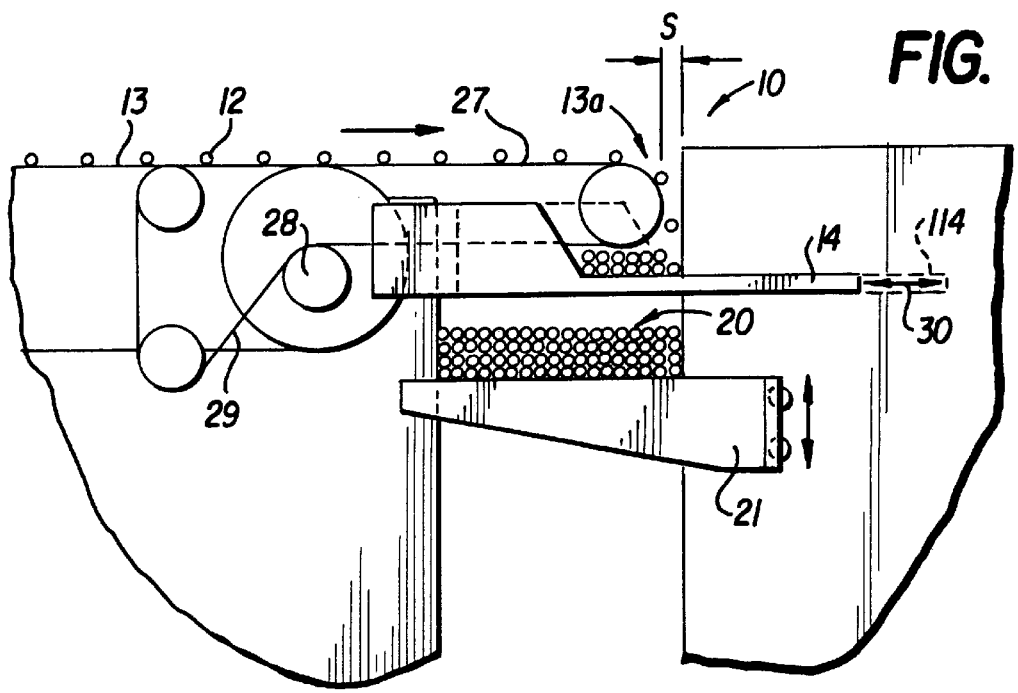

METHOD TO FORM BUNDLES OF ROLLED SECTIONS AND RELATIVE DEVICE

FIELD OF THE INVENTION

This invention concerns a method to form bundles of rolled sections and the relative device.

The invention is used to form bundles of rolled sections fed continuously, or substantially continuously, by transport means associated with the line which produces the bars.

BACKGROUND OF THE INVENTION

In the following description, the term rolled sections is intended to mean both bars with a simple section and bars with a complex section of any form whatsoever.

The state of the art covers devices used to form bundles of rolled sections, arranged in orderly layers or piled up haphazardly, located downstream of the cooling area placed at the outlet of the rolling train for bars.

The devices for forming the bundles cooperate with the end part of the transport means which feed the rolled sections coming from the cooling area in a direction which is normally at a right angle to the axis of the rolled sections.

Solutions known to the art include rod or finger means which, rotating or translating around an axis lying on a plane substantially parallel to the plane on which the rolled sections lie, remove the sections from the transporter, or collect them as they fall from the transporter, and unload them at a storage and tying station.

The first problem with devices such as this is that it is difficult to define homogeneous groups of rolled sections to be unloaded in the storage and tying station to form bundles with a homogeneous conformation and/or consistency.

This problem is even greater when the rolled sections are small, because of the close proximity between them and the speed with which they are fed by the transport means.

Another serious problem is that, during the step when the rolled sections are collected or picked up from the transport means, they may be twisted or superimposed, during the transfer and/or discharge to the storage and tying station.

These twisting movements and/or superimpositions occur when the rolled sections are allowed to fall from the transport means and collected by the rod means or finger means, or when the rod means or finger means discharge the sections into the storage and tying station.

This is also due to the uncontrolled movements to which the sections are subject when they are on the rod means or finger means.

These twisting movements or superimpositions make it more difficult to form and tie the bundles, which are therefore disorderly and not very compact.

Another problem with devices known to the art is that the cycle for forming the bundle is very long.

In these devices, when one layer is complete and the rod means or finger means transfer the rolled sections from the transport means to the tying and/or discharge means, it is necessary to interrupt the feed of the rolled sections.

In fact it is necessary to allow the rod means or finger means to complete the translation and unloading steps before they return to their operating position to pick up or collect the sections.

Another problem is the height at which the sections are discharged from the conveyor belt to the rod means or finger means which carry out the unloading and translation.

The greater this height is, the more it causes, during the unloading step, superimpositions, misalignments and twisting movements which are all the more accentuated when the sections are thin and when the speed of feed is higher.

The prior art documents DE-A-2445470, DE-A-2401174, WO-A-9614247 and EP-A-282800 show devices to form bundles of rolled bars or tubes which are clearly designed for large diameter products, which do not have the above-mentioned problems of superimposition, twisting, lack of homogeneity of the formed layer, etc.

Therefore, these known devices do not contribute anything to solve the specific problem of this invention, nor do they solve the problem of reducing the times required for every cycle for the formation of the bundle.

SUMMARY OF THE INVENTION

The present applicants have designed, tested and embodied this invention to overcome the shortcomings of the state of the art and to provide further advantages.

This invention is set forth below.

The purpose of the invention is to provide a method to form bundles of rolled sections, and the relative device, which will allow the arrangement of compact bundles, orderly and substantially homogeneous in conformation and consistency.

A further purpose is to reduce to a minimum the twisting movements and superimpositions of the sections during the discharge step.

Another purpose is to obtain a reduction in the duration of the cycle to form and discharge the bundles.

The device according to the invention comprises discharge rods which cooperate with the terminal end of the transporter.

The discharge rods are arranged on a plane underneath the upper plane of the transporter where the sections arrive and are movable on a plane which is substantially parallel to the said plane.

During the cycle when the layers are being formed, the discharge rods move progressively, at a speed which is coordinated with the speed of discharge of the rolled sections with respect to the zone where the sections are unloaded and which corresponds to the terminal end of the transporter.

According to a variant, the discharge rods cooperate with at least a frontal abutment means, which is movable in relation to the rods, to contain the layer which is progressively formed on the discharge rods.

The coordinated and progressive movement of the discharge rods causes the layer to be formed by the sections falling onto the discharge rods; the layer consists of one or more superimposed rows of adjacent sections.

This progressive movement of the discharge rods defines a free space substantially mating with the bulk of each individual section, due to the arrangement of the sections as they fall from the transporter.

The discharge procedure substantially prevents any lateral displacement, tangling or twisting movements of the rolled sections which are unloaded onto the discharge rods in an orderly manner, and thus form layers of sections which are compact and even.

According to a variant, at the front part of the terminal end of the transporter there is a stationary abutment means which further assists the fall of the sections onto the discharge rods and prevents any unwanted transverse movements.

Cooperating with the discharge rods and in a position underneath them there is a storage and discharge assembly comprising at least a transfer element.

The transfer element is arranged immediately below the discharge rods and collects the layer of rolled sections as soon as it is complete and has been released by the discharge rods themselves, when the rods return to their starting position.

In one embodiment of the invention, as the discharge rods are repositioned, the movable abutment means remains stationary in its position and cooperates with the transfer element to contain the layer of sections which has been unloaded onto the transfer element.

Subsequently, the transfer element is lowered by a value mating with the height of the layer, and allows the progressive coordinated movement of the discharge rods and the movable abutment means to start again. In the meantime, the movable abutment means has returned to its starting position, in order to form a new layer.

The repetition of the cycle makes it possible to form a desired number of layers on the transfer element, according to the desired dimension of the bundle to be formed.

Once the bundle has been completed, it is rested by the transfer element onto the tying and/or discharge means.

According to a variant, the transfer element cooperates with lateral containment means suitable to limit the transverse displacements of the rolled sections during the step when the layers are collected and when the formed bundle is transferred.

Thanks to the cooperation between the discharge rods and the storage and discharge assembly, it is possible to reduce the duration of the cycle by which the bundles are formed.

In fact, it is possible to begin the formation of a new layer of sections on the discharge rods immediately after the previously formed layer has been released onto the transfer element.

Moreover, the bundle of sections is transferred to the tying and discharge station (if any) when a new layer is being formed, without the need to interrupt the feed of the sections from the transporter.

Nor does the tying and discharge of the bundle interrupt the unloading and the formation of new layers onto the discharge rods.

BRIEF DESCRIPTION OF THE DRAWINGS

The attached figures are given as a non-restrictive example and show a preferred embodiment of the invention as follows:

FIGS. 2, 3, 4, 5 show the device as in FIG. 1 in subsequent operating steps.

FIG. 6 shows a variant of the device as shown in FIGS. 1–5.

DETAILED DESCRIPTION OF THE PREFERRED EMBODIMENTS

Figure 1:
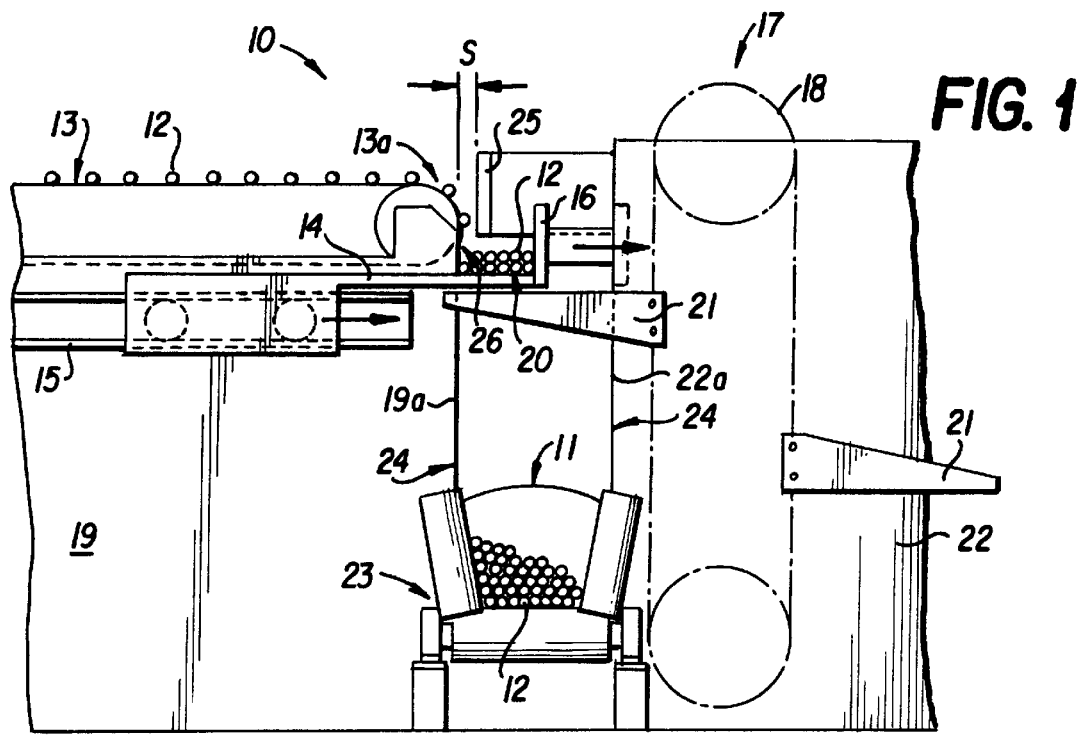
FIG. 1 shows a side view in diagram form of the device to form bundles of rolled sections according to the invention in a first operating step.

The reference number 10 denotes generally the device to form bundles 11 of rolled sections 12, in this case bars with a round section, according to the invention.

The device 10 cooperates with the terminal end 13a, where the sections 12 fall, of a transporter 13 for rolled sections 12 arranged downstream of the cooling area of a line for rolling bars.

The device 10 comprises discharge rods 14 arranged below the transporter 13.

The discharge rods 14 are able to move forwards and backwards on a plane substantially parallel to the upper plane of the transporter 13 where the sections 12 are translated.

A first embodiment of the invention is shown in FIGS. 1–5.

In its position of extreme retraction (FIG. 4), the discharge rods 14 are arranged in a beginning-of-cycle position which is below the transporter 13; as they advance, they progressively protrude at the front with respect to the terminal end 13a of the transporter 13, until they reach a desired position of maximum advance.

This position of maximum advance (FIG. 2) is correlated to the width of the bundle 11 which is to be formed.

In this case, the discharge rods 14 move on a guide 15 which is solid with a support structure 19.

The discharge rods 14 move in coordination with at least a mating movable abutment means 16 located at their front part; while the layer 20 of sections 12 is being formed, the abutment means 16 cooperates with the terminal end of the discharge rods 14.

The discharge rods 14 also cooperate with a storage and unloading assembly 17 comprising one or more transfer elements 21, in this case mounted on a ring-type movement system 18.

The cycle to form the bundle 11 includes a first step when one layer 20 is. formed, consisting of one or more superimposed rows of rolled sections 12, on the discharge rods 14.

Figure 2:
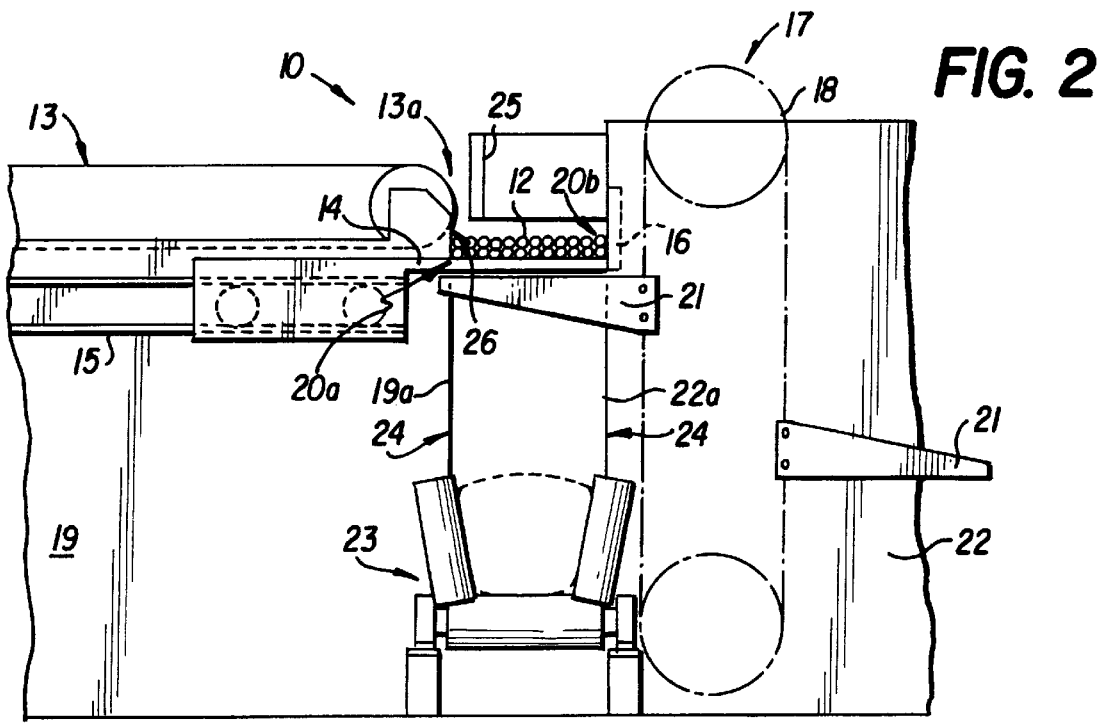

During this step, the discharge rods 14 advance from the beginning-of-cycle position of maximum retraction, progressively collecting the rolled sections 12 discharged from the transporter 13 until they reach their position of maximum advance (FIG. 2). The progressive advance of the discharge rods 14 is coordinated to the movement of the movable abutment means 16.

The movable abutment means 16 contains the outer end 20b of the bundle 20.

The speed of movement of the discharge rods 14 and of the movable abutment means 16 is correlated to the speed at which the rolled sections 12 are discharged from the transporter 13 and to the desired height of the layer 20 being formed.

The speed is such as to cause a lateral space "s", substantially mating with the section of a single rolled section 12, on the discharge rods 14 for every discharge cycle.

The lateral space "s" is defined on one side by lateral limitation means 26, in this case the front wall 19a of the supporting structure 19, and on the other side, at first by the movable abutment means 16 and later by the rolled sections 12 which have already been deposited onto the discharge rods 14.

In this case, the device 10 includes a stationary abutment means 25 arranged at the front of the terminal end 13a of the transporter 13 and suitable to guide the rolled sections 12 as they fall onto the discharge rods 14 and prevent any unwanted transverse movements.

When the formation of the layer 20 is complete (FIG. 2), the transporter 13 is stopped and, while the movable abutment means 16 stays in its position, the discharge rods 14 begin to retract, taking the inner end 20a of the layer 20 to abut against the lateral limitation means 26.

Figure 3:
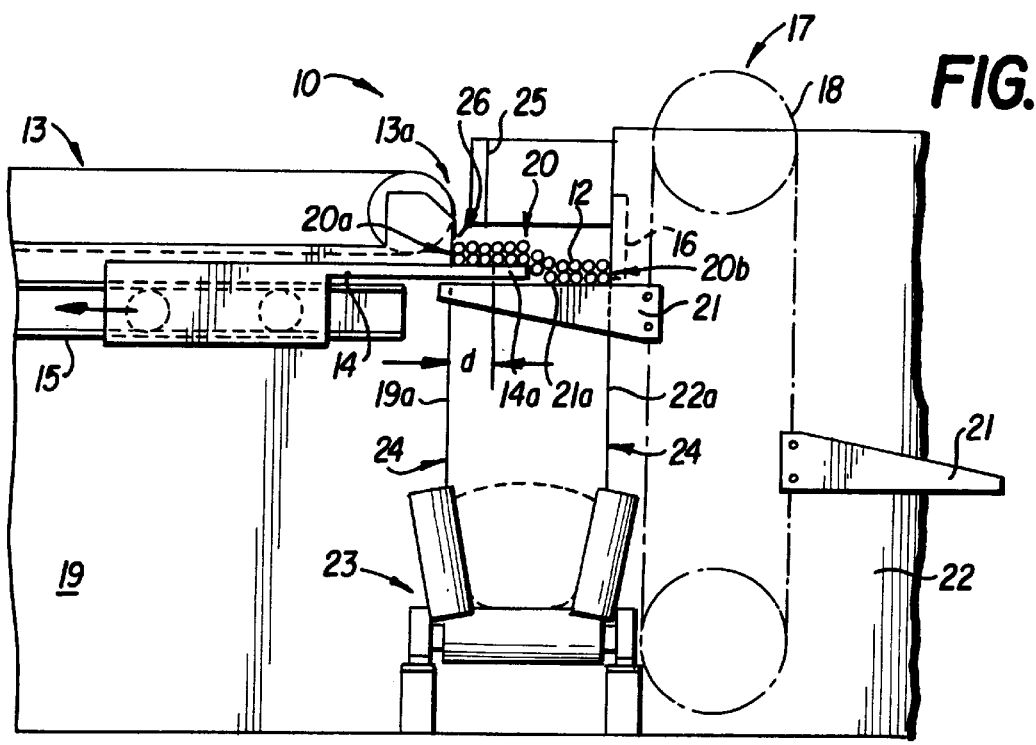
Figure 4:
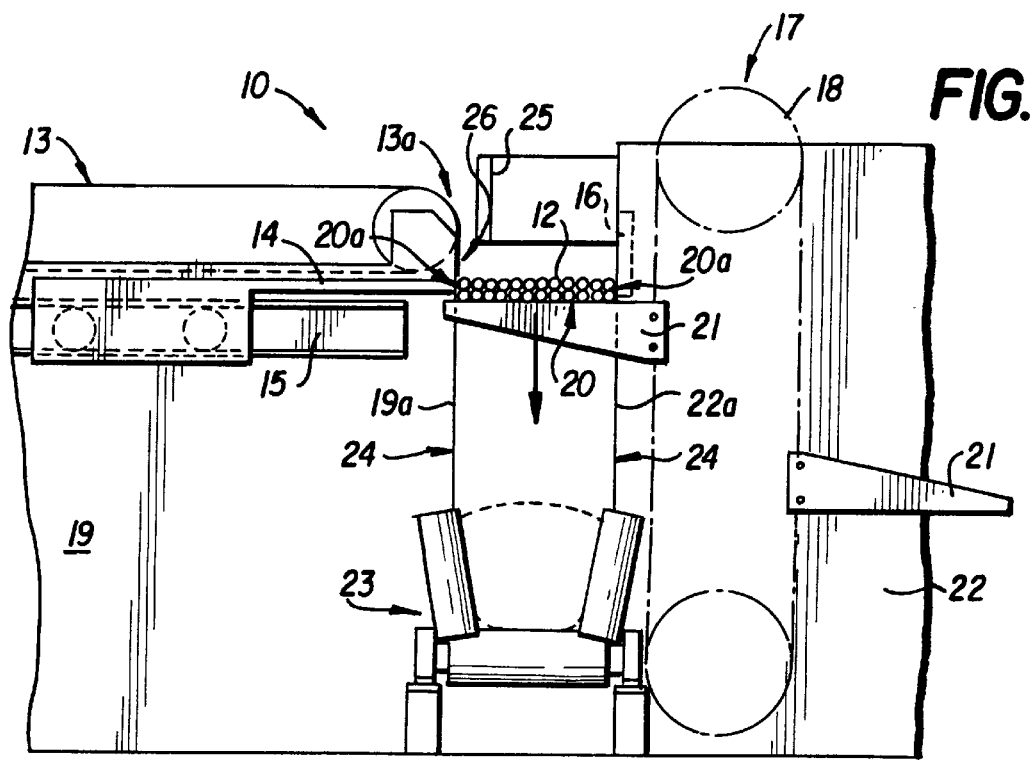

This causes the progressive fall of the layer 20 onto the transfer element 21 which is placed beneath the discharge rods 14 (FIG. 3).

During this step, the movable abutment means 16 cooperates with the transfer element 21 to contain the layer 20 which has been unloaded.

The space "d" between the lower face 14a of the discharge rods 14 and the upper face 21a of the transfer element 21 is less than the smallest of the sections of the rolled sections 12; this prevents any rolled section 12 from entering between the lower face 14a and the upper face 21a of the transfer element 21.

When the layer 20 is entirely arranged on the transfer element 21 (FIG. 4), the movement system 18 causes the transfer element 21 to be lowered by a value which is correlated to the height of the layer 20, in such a way as to allow the discharge rods 14 to advance and form a new layer 120 (FIG. 5).

Before the discharge rods 14 are made to advance, the movable abutment means 16 is taken back to the beginning-of-cycle position, so as to contain the new layer 120 which is to be formed.

In one embodiment of the invention, the amount by which the transfer element 21 is lowered is defined by photoelectric cell means which are not shown in the figures.

Once the new layer 120 has been completed, it is deposited above the layer 20 which is supported by the transfer element 21; the cycle then starts again until the bundle 11 has been completely formed.

The bundle 11 thus formed is then deposited by the transfer element 21 in correspondence with the storage, tying and/or discharge station 23, in this case consisting of an underlying rollerway.

It is possible to carry out the steps of lowering, tying and discharging the bundle 11 while a new cycle to form layers 20 for a new bundle 11 is already under way (FIG. 1) on the discharge rods 14.

In this case, there are two transfer elements 21: while one transfer element 21 deposits the bundle 11 onto the rollerway 23, the other is taken under the discharge rods 14.

FIG. 6 shows another embodiment of the invention wherein, at the beginning of the cycle to form the layer 20, the discharge rods 14 are in their position of maximum advance and, as the discharge of the sections 12 from the transporter 13 continues, the rods 14 retreat in the direction 30 defining, for every step of retreat, a space "s" wherein the section 12 falls.

When one or more layers 20 have been formed on them, the discharge rods 14 retreat further and discharge the layers formed on the transfer element 21; after this, the discharge rods 14 return to the start-of-cycle position 114 as shown by the line of dashes in FIG. 6.

In this case, the transporter 13 includes an end transporter 27 which occupies a very limited vertical space and which displaces substantially forwards the terminal end 13a where the sections 12 fall.

In this case, the end transporter 27 is shaped wider at the rear part, there being a guide roller 28 in cooperation with an oblique side 29 defining the wider rear part.

The discharge rods 14 are positioned below the end transporter 27 at a desired distance suitable to contain one or more desired layers of sections 12.

This means that the provisional layer 20 which is formed on the discharge rods 14 is very near the upper plane of the transporters 13 and 27.

This conformation of the end transporter 27 and the position of the discharge rods 14 with respect thereto makes it possible to achieve an extremely limited falling distance for the sections 12 from the end transporter 27 to the discharge rods 14; this further increases the precision with which the sections 12 are discharged, and consequently reduces the risk of superimpositions and entanglements during the formation of the layers 20.

In this case, the transfer elements 21 cooperate with lateral containment means 24 to support the layers 20 and to move the bundle 11 towards the rollerway 23. These means 24 substantially prevent any transverse movement of the rolled sections 12, and contribute to keep the layers 20 and/or the whole bundle 11 orderly and compact.

In this case, the lateral containment means 24 consist on one side of the front wall 19a and on the other side of the facing wall 22a of the supporting structure 22 of the storage and unloading assembly 17.

We claim:

1. A method to form bundles (11) of one or more layers (20) of rolled sections (12), each layer (20) including at least a row of adjacent rolled sections (12) comprising:

transporting each rolled section (12) on a transporter (13) having a terminal end (13a), wherein the rolled sections (12) lie adjacent to each other in a direction substantially at right angles to the longitudinal axis of the sections (12) on an upper plane during said transporting discharging said rolled sections (12) from the terminal end (13a) of the transporter to cause the rolled sections (12) to fall from the terminal end (13a) onto discharge rods (14);

forming at least one layer (20) of said rolled sections (12), which fall from the terminal end (13a) of the transporter (13) onto said discharge rods (14), said discharge rods (14) being arranged parallel to the transporter (13) and on a plane underneath the upper plane where the sections (12) are transported on the transporter (13), axially displacing the discharge rods (14) with respect to the transporter (13) to sequentially define from time to time, a series of lateral discharge spaces ("s") adjacent the terminal end (13a), for placing the sections (12) on the rods (14), wherein each lateral discharge space ("s") equals a transverse dimension of each rolled section (12), correlating the axial displacing of the rods (14) with respect to the transporter (13) to be sequential with the discharge of the sections (12) from the transporter (13);

progressively retracting the discharge rods (14) to transfer the layer (20) from the discharge rods (14) to a storage and unloading assembly (17) which has at least one transfer element (21) located on a plane below the discharge rods (14);

lowering from time to time the transfer element (21) by a distance substantially correlated to the height of the layer (20) located on the rods (14);

progressively forming a bundle (11) with a desired number of layers (20) by the sequentially repeating said forming of said at least one layer (20) on the discharge rods (14) and the subsequent unloading of the at least one layer (20) onto the transfer element (21);

discharging the bundle (11) from the storage and unloading assembly (17).

2. The method as in claim 1, wherein the discharge rods (14) move progressively with respect to the transporter (13), during the formation of the layer (20), on a plane substantially parallel to the plane on which the rolled sections (12) arrive, from a position underneath the upper plane of the transporter (13) to a position which becomes gradually further out with respect to the terminal end (13a) of the transporter (13).

3. The method as in claim 1, wherein the discharge rods (14) move progressively with respect to the transporter (13), during the formation of the layer (20), on a plane substantially parallel to the plane on which the rolled sections (12) arrive, from a position completely outside the transporter (13) to a position inside and below the terminal end (13a) of the transporter (13).

4. The method as in claim 1, wherein, to form the layer (20), the outer end of the discharge rods (14) cooperates with a movable abutment means (16) in coordination with the discharge rods (14).

5. The method as in claim 1, wherein, to transfer the layer (20) to the transfer element (21), the discharge rods (14) cooperate, during their progressive reverse movement, with lateral limitation means (26) associated with the inner end (20a) of the layer (20).

6. The method as in claim 1, wherein, when the bundle (11) is deposited from the transfer element (21) to a station (23) for performing at least one function selected from the group consisting of storing, tying or containing, the inner end (20a) and the outer end (20b) of the relative layers (20) cooperate with respective lateral containment means (24).

7. The method as in claim 1, wherein, when the rolled sections (12) are unloaded from the transporter (13) to the discharge rods (14), the rolled sections (12) cooperate with a stationary abutment means (25) arranged in front of the terminal end (13a) of the transporter (13).

8. A device to form bundles (11) of one or more layers (20) of rolled sections (12), each layer (20) comprising at least one row of adjacent rolled sections (12), the device being used in cooperation with a transporter (13) suitable to transport the rolled sections (12) as they lie one rolled section (12) adjacent to another rolled section (12) in a direction substantially at right angles to the longitudinal axis of the rolled sections (12) themselves, the transporter having a terminal end (13a) for discharging the sections (12) to cause the sections (12) to fall from the transporter (13), the device being suitable for discharging said sections (12) to at least a station (23) to perform at least one function selected from the group consisting of storing, tying or discharging the bundles (11), the device comprising:

discharge rods (14) on which the layer (20) is formed, the discharge rods (14) being locatable to receive sections (12) as the sections (12) fall from the terminal end (13a) of the transporter (13) and be in a position underneath an upper plane of the transporter (13), the discharge rods (14) being axially movable with respect to the transporter (13) on a plane substantially parallel to the upper plane of the transporter (13) from a first position where the formation of the layer (20) is begun to sequentially define from time to time, a series of lateral discharge spaces ("s") adjacent the terminal end (13a), for placing the sections (12) on the rods (14), wherein each lateral discharge space ("s") equals a transverse dimension of each rolled section (12), to a second position where the formation of the layer (20) is completed on the discharge rods (14), a storage and unloading assembly (17) upon which the layer (20) of rolled sections (12) is deposited to form at least a part of the bundle (11) comprising at least a transfer element (21), the transfer element (21) being arranged in a position underneath the discharge rods (14) and being movable from a first position to receive the layer (20) from the discharge rods (14) to at least a second position which is achieved when the deposited rolled sections (12) are transferrable to the station (23) to perform at least one function selected from the group consisting of storing, tying, or discharging the bundles.

9. The device as in claim 8, wherein the discharge rods (14) include a first position, where the layer (20) starts forming, underneath the upper plane of the transporter (13) and a second position, where the layer (20) is completely formed, outside the end (13a) of the transporter (13), the distance between the first position and the second position defining the width of the layer (20).

10. The device as in claim 8, wherein the discharge rods (14) include a first position, where the layer (20) starts forming, wholly outside the transporter (13), and a second position, where the layer (20) is completely formed, underneath the end (13a) of the transporter (13) where the sections (12) fall, the distance between the first position and the second position defining the width of the layer (20).

11. The device as in claim 8, wherein the discharge rods (14) are associated with at least a movable abutment means (16) which contains an outer end (20b) of the layer (20) being formed.

12. The device as in claim 8, which comprises lateral limitation means (26) providing a stationary surface to contact an inner end (20a) of the layer (20) to unload the layer (20) from the discharge rods (14) to the transfer element (21).

13. The device as in claim 8, which comprises a stationary abutment means (25) having a front wall for cooperating with the terminal end (13a) of the transporter (13) during the step when the rolled sections (12) are discharged onto the discharge rods (14).

14. The device as in claim 8, wherein the storage and unloading assembly (17) comprises at least two transfer elements (21) functioning alternately.

15. The device as in claim 14, wherein the transfer elements (21) are associated with a ring-type movement system (18).

16. The device as in claim 8, wherein the transfer element (21) cooperates with lateral containment means (24) having surfaces for guiding the layers (20).

17. The device as in claim 8, wherein the transporter (13) includes an end transporter (27) of limited vertical size and a wider shaped rear part, the transporter (27) displacing the terminal end (13a) where the sections (12) fall in a forward direction with respect to the end of the transporter (13).

18. The method as in claim 2, wherein, to form the layer (20), the outer end of the discharge rods (14) cooperates with a movable abutment means (16) in coordination with the discharge rods (14).

19. The method as in claim 2, wherein, to transfer the layer (20) to the transfer element (21), the discharge rods (14) cooperate, during their progressive reverse movement, with lateral limitation means (26) associated with the inner end (20a) of the layer (20).

20. The method as in claim 3, wherein, to transfer the layer (20) to the transfer element (21), the discharge rods (14) cooperate, during their progressive reverse movement, with lateral limitation means (26) associated with the inner end (20a) of the layer (20).

* * * * *

UNITED STATES PATENT AND TRADEMARK OFFICE
CERTIFICATE OF CORRECTION

PATENT NO. : 5,956,928
DATED : September 28, 1999
INVENTOR(S) : Bordignon et al

It is certified that error appears in the above-identified patent and that said Letters Patent are hereby corrected as shown below:

Line [73], change "Mecchaniche" to --Meccaniche--

Signed and Sealed this

Seventeenth Day of April, 2001

Attest:

NICHOLAS P. GODICI

Attesting Officer      Acting Director of the United States Patent and Trademark Office